United States Patent [19]
Despland et al.

[11] Patent Number: 5,490,996
[45] Date of Patent: Feb. 13, 1996

[54] PROCESS FOR PRODUCING AN IMPROVED SUCROSE-FREE MILK CHOCOLATE

[75] Inventors: Claude Despland, Neuchatel; Christophe Gnagi, Vilars; Giacomo Podavini, Neuchatel, all of Switzerland

[73] Assignee: Kraft Jacobs Suchard AG, Zurich, Switzerland

[21] Appl. No.: 179,862

[22] Filed: Jan. 11, 1994

[51] Int. Cl.[6] ........................................... A23G 1/00
[52] U.S. Cl. ............................. 426/548; 426/660
[58] Field of Search ........................... 426/631, 660, 426/548, 631, 659

[56] References Cited

U.S. PATENT DOCUMENTS

| | | | |
|---|---|---|---|
| 4,292,337 | 9/1981 | Anderson | 426/660 |
| 4,759,940 | 7/1988 | Cattaneo | 426/660 |
| 4,980,189 | 12/1990 | Keme | 426/660 |
| 5,017,392 | 5/1991 | Bombardier | 426/548 |
| 5,017,400 | 5/1991 | Olinger | 426/660 |
| 5,045,340 | 9/1991 | Kohler | 426/660 |
| 5,063,080 | 11/1991 | Kreeger | 426/660 |
| 5,223,303 | 6/1993 | Taskinen | 426/660 |
| 5,238,698 | 6/1992 | Zumbe et al. | 426/572 |
| 5,266,348 | 7/1992 | Zumbe et al. | 426/660 |
| 5,314,701 | 5/1994 | Mentink | 426/660 |

FOREIGN PATENT DOCUMENTS

| | | |
|---|---|---|
| 15997/92 | 5/1992 | Australia . |
| WO93/02566 | 8/1991 | Belgium . |

*Primary Examiner*—Carolyn Paden
*Attorney, Agent, or Firm*—Joyce P. Hill; Thomas R. Savoie

[57] ABSTRACT

A product and process is provided for producing an improved-flavored, sucrose-free milk chocolate having the taste and mouthfeel of a traditional milk chocolate.

8 Claims, No Drawings

PROCESS FOR PRODUCING AN IMPROVED SUCROSE-FREE MILK CHOCOLATE

BACKGROUND OF THE INVENTION

The present invention relates to an improved sucrose-free milk chocolate process and product. More specifically, the invention relates to a process for producing a improved flavored, sucrose-free milk chocolate having the taste and mouthfeel of a traditional milk chocolate.

Sucrose-free chocolate for diabetics has long been known wherein sucrose is replaced by sorbitol. Other sugar alcohols similar to sorbitol such as isomalt, lactitol, maltitol, etc., have recently been permitted in foodstuffs including sugar-free milk chocolate compositions. The difficulty in using sugar alcohols or other sucrose substitutes is achieving flavor, texture and mouthfeel comparable to that of traditional milk chocolate.

Australia patent application AU-A-15997/92 assigned to Roquette Freres and published Nov. 12, 1992 describes a low calorie chocolate production technique using polyols such as xylitol or erythritol in a one step process trying to overcome a high fat content in the chocolate product but not recognizing the importance of achieving an improved milk chocolate flavor.

PCT Patent Application, International publication umber WO93/02566 published Feb. 18, 1993 and assigned to Raffinerie Tirlemontoise S. A. describes a reduced calorie chocolate confectionery composition in which sugar is wholly or partially replaced by inulin. In this application, it is stated that inulin is well known as an additive in food products although no recognition is suggested to provide improved flavored milk chocolate.

U.S. Pat. Nos. 5,238,698 issued Aug. 24, 1993 and 5,266,348 issued Nov. 30, 1993, commonly assigned to the assignee of this invention, both identify sucrose-free milk chocolate products and process. In the '698 patent, the lower calorie chocolate composition using sugar alcohols were aerated to provide a lower density product while the '348 patent also using sugar alcohols produced lower calorie, lower density chocolate compositions by flaking the chocolate paste composition. Although satisfactory products were produced in the '698 and '348 patents, a very special highly desired flavor was not achieved for these chocolate compositions. A desirable improved flavor is obtainable in milk chocolate at elevated temperatures. A rounded mellow note is obtained due to an improved milk caramelic flavor. However, most sucrose substitutes such as sugar alcohols cannot be heated to temperatures high enough without significant increases in viscosity or agglomeration to achieve the improved flavored low calorie or dietetic milk chocolate. By the process of this invention a low calorie or dietetic chocolate product substantially free of sucrose can be produced which contains a highly desirable improved flavor.

SUMMARY OF THE INVENTION

In accordance with the present invention, a process is provided for producing a low calorie or a dietetic milk chocolate composition substantially free of sucrose that develops outstanding taste and texture of a chocolate with sucrose substitutes. The chocolate composition of this invention is prepared using two different processes to achieve the desired result. Each of the processes is based on the limits of the thermal properties of the sucrose substitutes. In one of the processes, polydextrose or a sugar alcohol or combinations thereof, having high temperature resistance, is mixed, in the presence of an edible emulsifier with a milk powder and cocoa butter. The mixture is refined and conched at temperatures in the range from about 70° C. to about 100° C. for a period of time to liquefy and form an improved flavor. In another step, an additional sucrose substitute such as fructose or a sugar alcohol or combinations thereof, cocoa mass or liquor, cocoa butter and an edible emulsifier are mixed, refined and conched at temperatures in the range from about 35° C. to about 60° C. for a period of time to liquefy the product. The products of the two separate steps are combined in amounts to produce an improved flavored, sucrose-free milk chocolate.

DETAILS OF THE INVENTION

The chocolate composition of this invention is an improved sucrose-free, dietetic or low calorie milk chocolate having an improved flavor. To produce an improved flavor in chocolate, temperatures exceeding those which are unsatisfactory for most sugar alcohols are required. In this invention, a process is provided which utilizes two different processes and their combination to achieve a highly desirable chocolate product. Two different processes are conducted separately and the individual resulting products are combined to form the finished product. The sequence of preparation of these products is not critical as long as the resulting liquid products can be readily blended to form the desired improved flavored, sucrose-free, chocolate product.

One of the processes used in this invention, identified as the flavor-producing process, is the use of a sucrose substitute such as polydextrose, a specific sugar alcohol or combinations thereof, which at high temperatures such as about 70° C. to 100° C., does not release water of crystallization, inherently present, avoiding any undesirable increase in viscosity or agglomeration of the mixtures, and the sucrose substitute is mixed in the presence of an edible emulsifier with milk powder and cocoa butter. The mixture occurs at temperatures from about room temperature to about 45° C. for a period of time to mix the ingredients in a uniform manner. The mixture is then refined at temperatures below 40° C., utilizing known refining methods such as rollers to refine the mixed ingredients, to particle sizes of about 10 to 30μ (microns), preferably 15–20μ (microns). The refined product is then conched at temperatures from about 70° C. to about 100° C., preferably about 70° C. to about 90° C., for a period of time from about 3 to 24 hours or longer if necessary to liquefy the product and to achieve the desirable improved taste.

The amounts of ingredients in each of the two processes are based on the blended finished product. The sucrose substitutes can include polydextrose and sugar alcohols used in the flavoring producing process and the sugar alcohols include inulin, mannitol, maltitol and combinations thereof in amounts ranging from about 10 to about 25 weight percent, preferably from about 15 to about 22 weight percent. The milk powder as used in the flavor-producing process can be derived from any milk source such as whole milk, skim milk, milk protein and the like. The amount of milk powder present is about 10 to about 20 weight percent, preferably about 14 to about 30 weight percent. The cocoa butter used in this flavoring process can range from about 4 to about 15 weight percent, preferably about 5 to about 8 weight percent. In the mixture of the components of the flavoring process step, edible emulsifiers such as lecithin, polyglycerol polyrincinoleate, ammonium phosphatide and the like can be used in amounts ranging from about 0.01 to about 1.0 weight percent or higher. In addition, flavoring agents and other ingredients conventionally used in milk chocolate compositions such as nuts, i.e., hazelnut paste, almonds, etc., vanillin, salt and the like, can be used.

The other process of this invention can be referred to as a chocolate-producing process. This process mixes another sucrose substitute such as fructose or a sugar alcohol such as lactitol, sorbitol, xylitol, isomalt and combinations thereof, with cocoa mass or cocoa liquor, cocoa butter and an edible emulsifier. These ingredients are mixed at temperatures from about room temperature to about 45° C. for a period of time to provide a uniform distribution. The mixture is then refined at temperatures below 45° C. utilizing known refining methods such as rollers and the like to particle sizes of about 10 to 30μ (microns), preferably 15–20μ (microns). The refined product is then conched at temperatures from about 35° C. to about 60° C., preferably from about 35° C. to about 55° C. to liquefy the product. In using fructose or sorbitol, the conching temperature should not exceed 40° C. and for lactitol, isomalt or xylitol, the conching temperature should not exceed 55° C. In this chocolate-producing process, edible emulsifiers such as lecithin, polyglycerol polyricinoleate, ammonium phosphatide and the like can be used in amounts ranging from about 0.01 to about 1.0 weight percent or higher. In addition, flavoring agents and other ingredients conventionally used in milk chocolate compositions such as nuts, i.e., hazelnut paste, almonds, etc., vanillin, salt and the like.

The liquid products of the two processes, i.e., the flavor blending step and the chocolate-producing step described above, are blended at temperatures maintaining the liquid form at about 40° C. to about 50° C. to produce a sucrose-free milk chocolate having a nice flavor profile and ready to be molded into the desired known forms. The ratio of the flavor-producing product to the chocolate-producing product in the blending step depends on the amount of flavor desired and the finished chocolate product desired but can range from 3 parts flavor-producing to 1 part chocolate-producing to 1 part flavor-producing to 3 parts chocolate-producing. The total amount of fat should range from about 25 to about 40 weight percent, preferably 28 to 32 weight percent of the finished product.

Additional ingredients can be incorporated into the two processes used to produce the flavor- and chocolate-producing steps. If additional sweeteners are required, intense sweeteners such as aspartame, sucralose, alitame, acetosulfame K and the like and mixtures thereof can be used in amounts depending on sweetness level desired. Additional ingredients such as edible carbohydrates having a relatively low metabolisable calorie count can be included such as additional polydextrose, oligofructose and the like. Furthermore, ingredients with low calorie count can be used in the milk chocolates of this invention including cereal fibers, cocoa fibers, vegetable fibers, cellulose such as microcrystalline cellulose, pectins and edible gums. The amounts of these ingredients are dependent on the type of chocolate composition one wishes to produce.

The refining and conching procedures used in this invention are standard and known to the chocolate industry. During refining and conching stages of the manufacture of the chocolate of this invention, steps must be taken to avoid any significant absorption of moisture in view of the hygroscopic nature of the sugar alcohols used.

The following examples illustrate the invention in greater detail:

EXAMPLE 1

Diet milk chocolate is prepared whereby the total recipe is divided into two parts each with its own process. Separation of the process is based on the limits of the thermal properties of the sugar substitutes.

Part 1 of Example 1

The following ingredients were placed in a mixer:

| Ingredients | % of Finished Blended Product |
| --- | --- |
| Inulin | 21.00 |
| Whole Milk Powder | 15.75 |
| Cocoa Butter | 8.00 |
| Lecithin | 0.25 |
|  | 45.00 |

The ingredients were mixed for 10 minutes at a temperature of 45° C. and then refined in a five roll refiner until a particle size of 20μ (microns) was obtained. Then the refined product was conched for 6 to 24 hours at temperatures in the range of 75° C. to 80° C. in order to obtain the desirable improved taste.

Part 2 of Example 1

The following ingredients were placed in a mixer:

| Ingredients | % of Finished Blended Product |
| --- | --- |
| Cocoa Liquor or Mass | 13.00 |
| Cocoa Butter | 13.00 |
| Vanillin | 0.01 |
| Lecithin | 0.25 |
| Fructose | 28.74 |
|  | 55.00 |

The ingredients were mixed for 10 minutes at a temperature of 40° C. and then refined at 40° C. in a five roll refiner until a particle size of 20μ (microns) was obtained. The refined product was conched for 6 to 24 hours at temperatures at 35° C. to 40° C.

Part 1 and Part 2 of Example 1 were blended at a temperature 40° C. and to produce an improved-flavored, sucrose-free, diet milk chocolate having the taste and mouthfeel of a traditional milk chocolate.

A similar product was obtained substituting lactitol for fructose in Part 2 of Example 1.

ADDITIONAL EXAMPLES

In Example 1, Part 2, substituting lactitol or sorbitol isomalt or xylitol for fructose, a low calorie (approximately 25% or a more reduced calorie count) chocolate composition having an improved flavor sucrose-free milk chocolate having the taste and mouthfeel of a traditional milk chocolate is produced.

What is claimed is:

1. A process for producing an improved sucrose-free milk chocolate which comprises the steps:
    (A)
    (1) separately mixing a sucrose substitute selected from the group consisting of polydextrose, inulin, mannitol, maltitol and combinations thereof with milk powder, cocoa butter and an edible emulsifier;

(2) refining and conciting the product of (A) (1) at temperatures in the range from about 70° C. to about 100° C. for a period of time to liquefy the product and to form an improved flavor;, and (B)
(1) separately mixing a sucrose substitute selected from the group consisting of lactitol, fructose, sorbitol, mannitol, xylitol, isomalt and combinations thereof, with cocoa mass, cocoa butter and an edible emulsifier;
(2) refining and conching the product of (B) (1) at temperatures in the range from about 35° C. to about 60° C. for a period of time to liquefy the product;

(C) blending the liquid, flavor-producing product of (A) and the liquid, chocolate-product of (B) at temperatures in the range from about 40° C. to about 50° C. to produce an improved-flavored, sucrose-free milk chocolate.

2. The process of claim 1 wherein the amounts based on the total blended product of step (C) are:

(1) In step (A) (1):
   (a) sucrose substitute from about 10 to about 25 weight percent;
   (b) milk powder from about 10 to about 20 weight percent;
   (c) cocoa butter from about 4 to about 15 weight percent;
   (d) emulsifiers from about 0.01 to about 1.0 weight percent; and
   (e) conching said mixture at temperatures from about 70° C. to about 90° C.;

(2) In step (B) (1):
   (a) cocoa mass from about 7 to about 20 weight percent;
   (b) cocoa butter from about 10 to about 25 weight percent;
   (c) sucrose substitute from about 20 to about 35 weight percent;
   (d) emulsifier from about 0.01 to 1.0 weight percent; and
   (e) conching said (B) (1) mixture at temperatures from about 40° C. to about 50° C.

3. The process of claim 2 wherein the amounts based on the total blended product of step (C) are:

(1) In step (A) (1):
   (a) sucrose substitute from about 15 to about 22 weight percent;
   (b) milk powder from about 14 to about 18 weight percent;
   (c) cocoa butter from about 5 to about 8 weight percent; and
   (d) emulsifier from about 0.1 to about 0.35 weight percent;

(2) In step (B) (1):
   (a) cocoa mass from about 10 to about 15 weight percent;
   (b) cocoa butter from about 10 to about 15 weight percent;
   (c) sucrose substitute from about 25 to about 30 weight percent; and
   (d) emulsifier from about 0 to about 0.35 weight percent.

4. The process of claim 3 wherein the sucrose substitute in step (A) (1) is inulin.

5. The process of claim 4 wherein the emulsifier is lecithin.

6. The process of claim 3 wherein the sucrose substitute in step (B) (1) is fructose and the conching temperature ranges from about 35° C. to about 40° C.

7. The process of claim 6 wherein the emulsifier is lecithin.

8. The process of claim 1 wherein the sucrose substitute in step (B) (1) is lactitol and the conching temperature ranges from about 40° C. to about 55° C.

* * * * *